Figure 1:
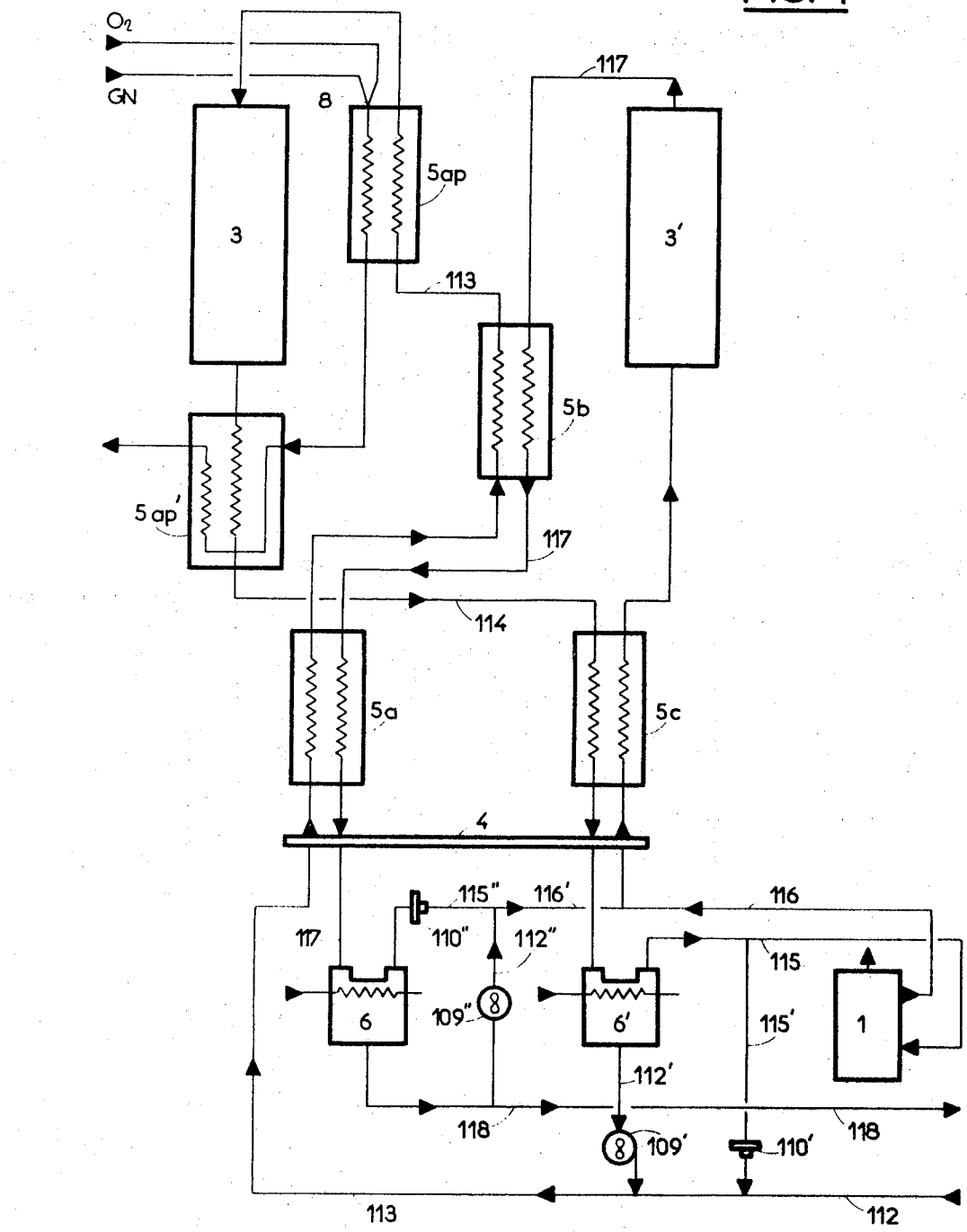

United States Patent [19]
Trichet et al.

[11] 3,864,466
[45] Feb. 4, 1975

[54] PROCESS FOR OBTAINING DEUTERIUM

[75] Inventors: Jean Trichet, Orangis; Guy Simonet, Paris; Jean-Pierre Guellaff, Vincennes, all of France

[73] Assignee: L'Air Liquide, Societe Anonyme pour l'Etude et l'Exploitation des procedes Georges Claude, Paris, France

[22] Filed: Jan. 20, 1971

[21] Appl. No.: 108,073

[30] Foreign Application Priority Data
Jan. 27, 1970 France .............................. 70.02779

[52] U.S. Cl. ................. 423/648, 622/580, 623/657, 623/658
[51] Int. Cl. ........................... C01b 4/00, C01b 5/02
[58] Field of Search ...... 23/214, 210; 423/644, 648, 423/657, 658, 580

[56] References Cited
UNITED STATES PATENTS

| | | | |
|---|---|---|---|
| 2,689,782 | 9/1954 | Murphree | 423/580 |
| 2,690,379 | 9/1954 | Urey et al. | 23/204 |
| 2,908,554 | 10/1959 | Hoogschagen | 23/210 |
| 2,927,003 | 3/1960 | Becker | 23/211 |
| 3,017,250 | 1/1962 | Watkins | 23/214 |
| 3,222,147 | 12/1965 | Benson | 23/214 X |
| 3,421,869 | 1/1969 | Benson | 23/214 X |
| 3,442,619 | 5/1969 | Huebler et al. | 423/658 |

*Primary Examiner*—Edward Stern
*Attorney, Agent, or Firm*—Browdy and Neimark

[57] ABSTRACT

The present invention relates to a process for obtaining deuterium from hydrogen, in which at least a part of the hydrogen is formed from recycling hydrogen, obtained from the gaseous stream originating from the said oxidation, purified beforehand from quantities of water which it contains by cooling and condensation.

7 Claims, 2 Drawing Figures

PROCESS FOR OBTAINING DEUTERIUM

The present invention relates to an improvement in the processes and installation for obtaining deuterium.

A process and an installation are knwon by which deuterium is obtained from hydrogen, in which the deuterium is obtained from hydrogen produced by oxidation of a metallic mass by means of steam, this means being then regenerated by reduction by means of at least a part of the hydrogen which is obtained, previously treated with a view to separating the deuterium.

The present invention has as its particular object a process for obtaining deuterium from hydrogen, in which at least a part of the hydrogen is produced by oxidation of a metallic mass with steam, this process being additionally characterised in that at least a part of the hydrogen is formed from recycling hydrogen obtained from the gaseous stream originating from the said oxidation, purified beforehand from quantities of water which it contains by cooling and condensation.

According to one embodiment of the present invention, the stream of recycling hydrogen, obtained from the gaseous stream coming from the said oxidation and purified beforehand from quantities of water which it contains by cooling and condensation, is added at ambient temperature to the stream of water intended for effecting the oxidation of the metallic mass with a view to producing hydrogen, from which the deuterium is subsequently separated.

According to another embodiment of the present invention, the water in excess is passed over the metallic mass to be oxidised, the water excess being separated by cooling and condensation from the gaseous stream originating from the oxidation of the metallic mass and being added, at ambient temperature, to the stream of water intended for effecting the oxidation of the metallic mass with a view to producing the hydrogen from which the deuterium is subsequently separated.

According to another embodiment of the invention, the mixture formed from water in excess and recycling hydrogen is brought into contact with the metallic mass to be oxidised at a temperature of approximately 800°C and leaves this metallic mass, formed for example of iron, at a temperature of the order of about 400°C.

By operating in this manner, it is possible to cause the development of the composition of the gaseous mixture as a function of the temperature, so that it remains very close to the composition which would be that of the equilibruum at each temperature.

According to one form of the process according to the invention, the regeneration is effected by reduction of the metallic mass by means of hydrogen in excess, of which at least a part, previously treated with a view to separating deuterium, is produced during the said oxidation of the metallic mass, and of which the excess is formed of recycling hydrogen obtained from the gaseous stream originating from the said reduction and purified beforehand from quantities of water which it contains by cooling and condensation, the said hydrogen excess being added at ambient temperature to the hydrogen drained of deuterium, coming from the said separation treatment of the deuterium.

According to another embodiment of the process according to the invention, the regeneration of the metallic mass by reduction by means of hydrogen in excess is effected in the presence of water, this water added at ambient temperature to the said hydrogen in excess intended to effect the reduction of the metallic mass, being separated by cooling and condensation from the gaseous stream originating from the said reduction.

According to yet another embodiment of the process according to the invention, the mixture formed of hydrogen in excess and steam is brought into contact with the metallic mass to be reduced at a temperature of the order of 400°C and leaves this metallic mass at a temperature of the order of about 800°C. By operating in this way, it is also possible to cause the development of the composition of the gaseous mixture as a function of the temperature, so that it remains very close to the composition which would be that of the equilibrium at each temperature.

According to one embodiment of the present invention, heat exchanges take place between the mixture producing the oxidation and the reduction of the metallic mass, the heat supply being obtained from an external source, due for example to the combustion of a natural gas in the presence of a combustion-supporting compound, such as air or oxygen, and preferably taking place at two temperature levels.

The present invention is also concerned with any installation for carrying out the process for obtaining deuterium as hereinbefore described.

Other objects and advantages of the present invention will become apparent from reading the following description and by reference to the accompanying drawings, given simply as non-limiting examples.

FIG. 1 comprises an arrangement 1 for the treatment of hydrogen with a view to separating deuterium, and reactors 3 and 3' containing a metallic mass.

In the constructional example as illustrated, the reactor 3 comprises a reducing divided metallic mass, while the reactor 3' contains this divided mass in the oxidised state and functions as a regenerator of the masses contained therein. It is obvious that these reactors can be changed over; a change-over device 4 permits the reactors to be changed over between the oxidation phase and the reduction phase.

Illustrated in FIG. 1 are heat exchangers 5a, 5b and 5c, separating condensers 6 and 6', two supplementary exchangers 5ap and 5'ap, a burner 8, pumps 109' and 109'' and gas compressors 110' and 110''.

The operation of the installation is as follows, this type of installation permitting the production of considerable quantities of heavy water, for example, of the order of 400 tons per year.

A volume of water at ambient temperature is introduced through a conduit 112. The temperature and the treated quantities (number of moles) are given by way of indication and so as to illustrate one embodiment of the invention.

The number of moles indicated below have been calculated on the basis of 1 mole of hydrogen supplying the hydrogen treatment device 1 with a view to separating deuterium.

By way of a conduit 112' by pump 109', about 0.23 mole of water is supplied to the conduit 112. Likewise, by means of a conduit 115' and a compressor 110', and 0.47 mole of hydrogen is introduced into the conduit 112. The water supplied through the conduit 112' and the hydrogen from the conduit 115' come from a separator 6' and are added to a volume of water corresponding to 1 mole of water, supplied by the conduit 112, which corresponds to the volume to be converted into hydrogen.

The water from the conduits 112 and 112' and the hydrogen from the conduit 115' are supplied by way of a conduit 113 towards the mass of divided iron contained in the reactor 3. First of all, however, the conduit 113 delivers into a first exchanger 5a, in which the mixture and hydrogen at ambient temperature, formed of 1.23 moles of water and 0.47 moles of hydrogen, is brought to a temperature in the region of 350°C, and then this conduit passes into a second exchanger 5b, in which the mixture is brought to 750°C. The mixture is then introduced into a superheater 5ap, in which it is brought to approximately 800°C by heat exchange with a source of external heat units, for example, due to the combustion in a burner 8 of a natural gas in the presence of a combustion supporter.

The mixture of steam and hydrogen at 800°C is conducted over the metallic mass of the reactor 3 and then leaves this reactor through a conduit 114 at a temperature of the order of 400°C. The gaseous current as thus obtained, formed of 1.47 moles of hydrogen and 0.23 mole of steam, is then introduced into an exchanger 5'ap, which it leaves at 450°C. In this exchanger 5'ap, the heat exchange is due to the passage, in counter-current with the gaseous mixture from the conduit 114, of the source of external heat units leaving the superheater 5ap.

The gaseous stream at 450°C from the conduit 114 is then introduced into an exchanger 5c, in which it is cooled to 70°C, and is then conducted into a separator 6', in which the steam contained in the hydrogen stream from the conduit 114 is condensed and separated. Through a conduit 115, 1 mole of hydrogen charged with deuterium is withdrawn, and this is conducted towards the deuterium separation installation 1.

The hydrogen leaving the deuterium separation installation 1, practically free from deuterium, has added thereto 0.47 mole of hydrogen provided by a compressor 110" and a conduit 115" and 0.23 mole of water provided by a conduit 112" and a pump 109".

The hydrogen from the conduit 115" and the water from the conduit 112" are united in a conduit 116', which delivers them into the conduit 116. The mixture thus obtained, formed of 1.47 moles of hydrogen and 0.23 mole of water, is introduced into the exchanger 5c, in counter-current with the hydrogen mixture originating from the reactor 3, and is brought therein to about 400°C. The mixture is then introduced at this temperature into the reactor 3', in which the oxidised metallic mass is reduced. The gaseous stream which leaves the reactor 3' by way of a conduit 117, at a temperature of about 800°C, is formed of 1.23 moles of steam and 0.47 moles of hydrogen.

This gaseous stream is introduced into the exchanger 5b, in which, by exchange with the mixture from the conduit 113, circulating in counter-current, it is cooled to about 200°C, and is then introduced into the exchanger 5a, which it leaves at about 70°C, and is thereafter brought into the separator 6, in which the remaining steam is condensed and separated. Through to conduit 118, there is withdrawn 1 mole of water free from deuterium.

Figure 2:
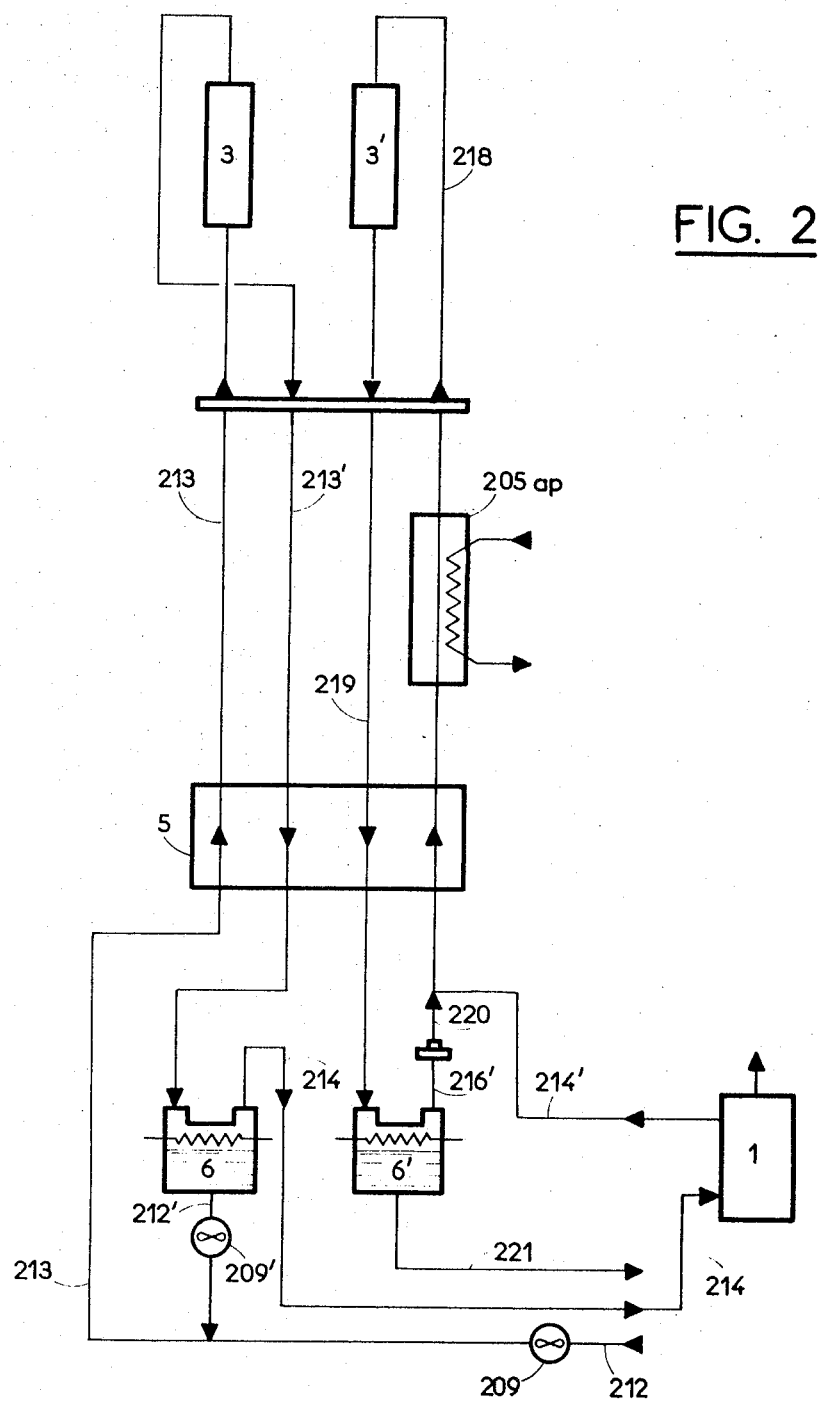

FIG. 2 represents a modification of the embodiment shown in FIG. 1.

Through a conduit 212' and a pump 209', about 0.475 mole of water at 20°C, coming from a separator 6, is combined in a conduit 213 with 1 mole of water at 20°C, supplied through a conduit 212 and a pump 209.

1.475 conduit 213, after extending into a flow change-over device 4 and into a main heat exchanger 5, causes about 1.475 moles of steam at 750°C to pass over the mass of divided iron contained in the reactor 3. This water is reduced by the mass of divided iron and the gaseous stream leaving the reactor 3 by way of the conduit 213', containing 1 mole of hydrogen and 0.475 mole of steam, after passing through the exchanger 5, is brought to a temperature of about 50–60°C in the separator 6. The steam contained in the gaseous stream from the conduit 213' is condensed and separated in the condenser 6. By way of the conduit 214, 1 mole of hydrogen charged with deuterium is brought towards the deuterium separation installation 1. The hydrogen leaving the deuterium separation installation 1 and practically free from deuterium has added thereto 0.54 mole of hydrogen supplied by a compressor 220 and a conduit 216'.

The conduit 218 leads towards the reactor 3', after passing through the heat change-over device 4, the exchanger 5 and a supplementary exchanger 205ap, about 1.54 moles of hydrogen. Through the conduit 219, and 1 mole of steam and 0.54 mole of hydrogen leaving the reactor 3' are carried towards the separator 6'. About 1 mole of water free from heavy water is drawn off from this separator through the conduit 221.

It is obvious that the invention is not in any way limited to the foregoing examples and numerous other modifications available to the person skilled in the art are possible, depending on the proposed applications, without thereby departing from the scope of the invention.

It is particularly expedient to point out that the installation as thus described operates in accordance with a substantially reversible procedure and consequently it results in relatively reduced operational costs. It is also necessary to note that the enthalpy exchangers in this installation have a substantial reversibility; this installation leads to relatively reduced energy losses.

We claim:

1. A process for obtaining deuterium comprising:
   a. passing first a gaseous stream consisting of water vapor and hydrogen to a metallic mass consisting essentially of divided iron;
   b. oxidizing the metallic mass with said first gaseous stream at a temperature of about 800° C to provide a second gaseous stream of hydrogen and water vapor, which leaves said oxidized metallic mass at a temperature of about 400° C.;
   c. cooling said second gaseous stream, condensing the water from said second stream and separating the hydrogen from the water;
   d. recycling at least a portion of the water separated in step (c) to said first stream used in oxidizing step (b);
   e. separating deuterium in a manner known per se from at least a portion of the hydrogen from step (c) to provide deuterium-free hydrogen;
   f. regenerating the metallic mass with a third gaseous stream consisting of hydrogen and water vapor at a temperature of about 400° C. said stream being free of deuterium, to obtain a fourth gaseous stream of water vapor and hydrogen which leaves said metallic mass at a temperature of about 800° C.;

g. cooling said fourth stream of water and hydrogen from step (f) to condense the water, and separating the water from the hydrogen; and h. mixing the hydrogen from step (g) with at least part of the deuterium-free hydrogen from step (e) and using the hydrogen mixture for said third gaseous stream for said regeneration step (f).

2. A process in accordance with claim 1 further comprising:

i. recycling a portion of the hydrogen obtained in step (c) to said first gaseous stream used in step (b) to effect said oxidizing.

3. A process in accordance with claim 2 further comprising:

j. recycling a portion of the water obtained in step (g) to the hydrogen mixture of step (h) for said third gaseous stream used to regenerate the metallic mass in step (f).

4. A process according to claim 1, wherein heat exchanges take place between the mixtures causing the oxidation and the reduction of the metallic mass, the supply of heat being obtained from an external source.

5. A process in accordance with claim 1 wherein for one mole of hydrogen supplied for the separation of deuterium, 1.475 moles of steam are passed as said first gaseous stream to said metallic mass in step (a), and wherein 0.475 moles of said mole of steam correspond to recycled water.

6. A process in accordance with claim 3 wherein for one mole of hydrogen supplied for the separation of deuterium, a mixture of 0.47 moles of recycled hydrogen and 1.23 moles of steam 0.23 moles of which correspond to recycled water are passed as said first gaseous stream to said metallic mass in step (a); and wherein said metallic mass consists essentially of divided iron.

7. A process in accordance with claim 3 wherein for one mole of hydrogen supplied for the separation of deuterium, a mixture of 0.23 moles of recycled water and 1.47 moles of hydrogen are fed as said third gaseous stream to the metallic mass in step (f) and wherein 0.47 moles of said moles of hydrogen approximately correspond to recycled hydrogen.

* * * * *

UNITED STATES PATENT OFFICE
CERTIFICATE OF CORRECTION

Patent No. 3,864,466            Dated February 4, 1975

Inventor(s) February 4, 1975

It is certified that error appears in the above-identified patent and that said Letters Patent are hereby corrected as shown below:

Col. 1, line 8, delete "means" second occurrence and insert -- means --

Col. 2, line 16, delete "mixture" and insert --mixtures--;

line 51, delete "temperature" and insert --temperatures--;

line 59, delete "by" and insert --and a--;

line 61, after "110'," delete "and" and insert --about--.

Col. 3, line 6, after "mixture" insert -- water -- line 57, delete "200° C," and insert --400° C,--;

line 61, delete "to" and insert --the--.

Col. 4, line 3, delete "1.475" and insert --The--.

Signed and sealed this 1st day of July 1975.

(SEAL)
Attest:

RUTH C. MASON
Attesting Officer

C. MARSHALL DANN
Commissioner of Patents
and Trademarks